US012698077B2

(12) United States Patent
Clough et al.

(10) Patent No.: US 12,698,077 B2
(45) Date of Patent: Aug. 4, 2026

(54) SLEEVE FOR A PAIR OF WIRING HARNESSES

(71) Applicant: AIRBUS OPERATIONS LIMITED, Bristol (GB)

(72) Inventors: James Clough, Bristol (GB); Javier Ruiz De Pablo, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 19/067,348

(22) Filed: Feb. 28, 2025

(65) Prior Publication Data

US 2025/0276783 A1 Sep. 4, 2025

(30) Foreign Application Priority Data

Feb. 29, 2024 (GB) ...................................... 2402894

(51) Int. Cl.
*B64C 3/56* (2006.01)
*H02G 3/04* (2006.01)

(52) U.S. Cl.
CPC ............. *B64C 3/56* (2013.01); *H02G 3/0462* (2013.01); *B64D 2221/00* (2013.01)

(58) Field of Classification Search
CPC ........ B64D 47/04; B64D 47/02; B64D 47/06; B64D 47/08; B64C 3/56; B64C 3/546; B64C 23/072; H02G 1/08; H02G 1/085; B25B 5/067; B25B 5/0892; B25B 5/101; B25B 5/125; B25B 3/00; B25B 269/143; B25B 269/249; B25B 269/902
See application file for complete search history.

(56) References Cited

U.S. PATENT DOCUMENTS

| | | | | |
|---|---|---|---|---|
| 4,445,741 A * | 5/1984 | Annoot | ................ | H01R 25/003 439/456 |
| 4,779,820 A | 10/1988 | Lambert | | |
| 7,201,593 B2 * | 4/2007 | Kondas | ................ | H01R 25/162 439/215 |
| 7,493,750 B2 | 2/2009 | Komiya | | |

(Continued)

FOREIGN PATENT DOCUMENTS

| | | |
|---|---|---|
| CN | 110396243 A | 11/2019 |
| CN | 110504058 A | 11/2019 |

(Continued)

OTHER PUBLICATIONS

Combined Search and Examination Report for GB2402894.6, dated Aug. 16, 2024, 8 pages.

(Continued)

*Primary Examiner* — Ashesh Dangol
(74) *Attorney, Agent, or Firm* — Nixon & Vanderhye, PC

(57) ABSTRACT

An aircraft with a folding wing tip arrangement and first and second wiring harnesses extending between a fixed wing and a wing tip device is disclosed. It is desirable to transfer power and/or data into a folding wing tip, which presents challenges such as repeated exposure to potentially harsh environmental conditions, with movement, and/or with changes in tensional loads. The wiring harnesses include a plurality of conductors and are arranged to transmit electrical power and/or data to the wing tip device. The sleeve includes two channels to receive the harnesses, the position of the channels being fixed, relative to one another, such that the harnesses are held apart.

15 Claims, 6 Drawing Sheets

(56) References Cited

U.S. PATENT DOCUMENTS

| | | | |
|---|---|---|---|
| 8,371,536 B2 | 2/2013 | Soenarjo | |
| 9,455,557 B2 | 9/2016 | Blanchard et al. | |
| 10,627,019 B1 * | 4/2020 | Franklin | F16L 57/00 |
| 11,336,058 B2 | 5/2022 | Liptak et al. | |
| 2006/0038088 A1 | 2/2006 | Dodson | |
| 2014/0014397 A1 * | 1/2014 | Lalancette | H02G 3/22 174/152 G |
| 2017/0075363 A1 * | 3/2017 | Steinke | F04D 13/08 |
| 2020/0346740 A1 * | 11/2020 | Good | B64C 5/08 |
| 2022/0139592 A1 | 5/2022 | Ooi | |
| 2022/0376626 A1 * | 11/2022 | Riar | H02J 1/102 |
| 2023/0242242 A1 | 8/2023 | Edwards et al. | |
| 2023/0242245 A1 | 8/2023 | Edwards et al. | |

FOREIGN PATENT DOCUMENTS

| | | |
|---|---|---|
| CN | 113421703 A | 9/2021 |
| CN | 218586865 U | 3/2023 |
| EP | 1497095 | 1/2005 |
| EP | 1799548 | 6/2007 |
| EP | 2167381 | 3/2010 |
| EP | 2604512 A2 | 6/2013 |
| EP | 2845797 A1 | 3/2015 |
| EP | 4093669 | 11/2022 |
| WO | 03086731 A1 | 10/2003 |
| WO | 2006027624 A1 | 3/2006 |
| WO | 2009010431 A1 | 1/2009 |
| WO | 2021180504 A1 | 9/2021 |
| WO | 2023165963 A1 | 9/2023 |

OTHER PUBLICATIONS

Double Folding Wing, Royal Navy Fairey Gannet, ECM.6—Imperial War Museum, Duxford, England, <https://www.flickr.com/photos/edk7/16715602686>, uploaded Mar. 7, 2015, 3 pages.

* cited by examiner

SLEEVE FOR A PAIR OF WIRING HARNESSES

CROSS RELATED APPLICATION

This application claims priority to United Kingdom Patent Application GB 2402894.6, filed Feb. 29, 2024, the entire contents of which is hereby incorporated by reference.

BACKGROUND OF THE INVENTION

The present disclosure relates to an aircraft comprising a fixed wing and a moveable wing tip device, with a wiring harness extending from the fixed wing into the wing tip device. The present disclosure also concerns a wing assembly, a protective sleeve for a wiring harness and a method of servicing a wiring harness.

There is a trend towards increasingly higher aspect ratio wings for large passenger aircraft, for which it is desirable to have correspondingly large wing spans. However, the maximum aircraft span is effectively limited by airport operating rules which govern various clearances required when manoeuvring around the airport (such as the span and/or ground clearance required for gate entry and taxiway usage).

Therefore, movable wing tip devices have been introduced into passenger aircraft, where a wing tip device is movable between a flight configuration for use during flight, and a ground configuration for use during ground-based operations. In the flight configuration, the wing tip device forms an extension of the wing and contributes to the lift generated by the wing. In the ground configuration, the wing tip device is moved away from the flight configuration such that the span of the aircraft wing is reduced, thereby allowing use of existing gates and taxiways. Such an arrangement is sometimes referred to as a 'folding wing tip'.

It is desirable to transfer power and/or data into a folding wing tip. In most parts of an aircraft, power and data can be readily provided via suitable electrical wiring. This is typically provided in a wiring harness (also referred to as a cable harness, or wiring loom). However, in the context of a folding wing tip there are several challenges. Firstly, the wiring harness must extend across a joint and therefore be arranged to cope with repeated exposure to potentially harsh environmental conditions, with movement, and/or with changes in tensional loads. Secondly, there tends to be relatively little available volume within the aircraft structure towards the tip of the wing. The ability to incorporate a degree of slack in the wiring harness may therefore be restricted.

It has also been recognised that it may be beneficial to provide a high voltage feed to the folding wing tip. However, the use of a high voltage feed presents several challenges. For example, it is necessary to provide sufficient segregation of the high voltage wiring from adjacent structure, to ensure the adjacent structure is not damaged in the event of arcing. It is also necessary to reliably segregate the high voltage wiring from other wiring. This can be challenging in the vicinity of the folding wing tip, because there tends to be relatively little space (a problem exacerbated by the need to provide two independent feeds within that space, to ensure redundancy). The movement of the folding wing tip can also cause movement of the wiring harness, so it may be necessary to provide additional tolerance to cater for this, both to ensure there is no risk of arcing and to ensure there is no potential for abrasion, for example between other wiring, where present.

Aspects of the present disclosure seek to mitigate one or more of the above-mentioned challenges. Alternatively or additionally, aspects of the present disclosure seek to provide an improved aircraft wing with a moveable wing tip device.

WO2023165963 (Latelec) discloses a fastener for fastening at least one cable to a structure of an aircraft wing, a portion of which is movable between an initial position and a final position. A clamping collar is inserted into a base plate, and the base plate holds the clamping collar in a nominal position when the movable portion of the structure is in the initial position. The clamping collar swivels about a swivel pin when one of the cables is biased in one direction by the movement of the movable portion of the structure. The collar returns to the nominal position when the cables are released. This arrangement seeks to address some of the above-mentioned challenges and is said to allow movement of the cable without damaging the cable or adjacent structure.

US20230242242 (Airbus Operations Limited) discloses a folding wing tip arrangement with an inductive coupler is arranged to inductively transmit data and/or power between the main wing element and the movable wing tip device. US20230242245 (Airbus Operations Limited) discloses a folding wing tip having an accumulator configured to store energy. The accumulator enables energy to trickle between the main wing element and the movable wing tip device whilst still providing a suitable power source to the device. In an embodiment of US20230242245 the energy is transferred using an inductive coupler. The use of an inductive coupler provides an alternative solution to the challenges of passing power and data across the folding wing tip joint, namely it removes the need for wiring to pass across that joint.

U.S. Pat. No. 9,455,557 (Airbus Operations Limited) discloses an electrical cable raceway and a protector for protecting wires/cables as they span a gap between sections of the raceway. U.S. Pat. No. 9,455,557 discloses a protector arrangement for cable raceways per se, rather than addressing the specific challenges with folding wing tips.

SUMMARY OF THE INVENTION

According to a first aspect of the disclosure, there is provided an aircraft comprising a wing, the wing comprising a fixed wing and a wing tip device moveably mounted at a joint at the end of the fixed wing, the wing tip device being moveable about the joint between: (i) a flight configuration for use during flight, and (ii) a ground configuration for use during ground-based operations, in which ground configuration the wing tip device is moved relative to the fixed wing such that the span of the wing is reduced. The aircraft comprises a wiring harness extending between the fixed wing and the wing tip device. The wiring harness comprises a plurality of conductors and is arranged to transmit electrical power and/or data to the wing tip device. The wiring harness is received in a protective sleeve.

The sleeve is an electrical insulator. According to a first aspect of the disclosure, the protective sleeve comprises a fluorosilicone polymer.

Such an arrangement with a sleeve comprising fluorosilicone polymer has been found to be especially beneficial. In particular, fluorosilicone polymer has been found to possess properties that make it surprisingly beneficial in the context of a folding wing tip. For example, this material may have good resistance to the environmental conditions that the sleeve is exposed to, as well as providing the necessary electrical insulation properties.

Fluorosilicone is an elastomer made up from silicone polymer chains with fluorinated side groups. The fluorosilicone polymer may comprise a silicone polymer having methyl and/or vinyl side groups attached to the silicon atoms in the chain, wherein at least some of the side groups are fluorinated. Optionally, the polymer comprises a fluorinated alkyl side groups, such as trifluoropropyl. Such fluorosilicone polymers may be of general formula (A):

Structure A

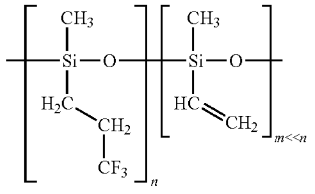

Such fluorosilicone polymers may be of general formula (B):

$$[\text{—}(Si(CH_3)_2\text{—}O)_m\text{—}(Si(CH_3)(C_2H_4CF_3)\text{—}O)_n\text{—}]$$ Structure B The fluorosilicone polymer may be known as a FVMQ material.

Optionally, the sleeve comprises at least 95% by weight of the fluorosilicone polymer, optionally at least 96%, optionally at least 97 wt %, optionally at least 98% and optionally at least 99% by weight of the fluorosilicone polymer. Optionally, the sleeve is formed from the fluorosilicone polymer.

The sleeve, and optionally the fluorosilicone polymer, may optionally have a hardness as measured on the Shore A hardness scale of from 60 to 80, optionally of from 62 to 78, optionally of from 65 to 75 and optionally of about 70. Such a hardness may be particularly effective in dealing with the multiple bending and unbending procedures to which a folding wingtip is subjected. Shore A hardness may be determined using ISO7619-1:2010.

An O-ring of the protective sleeve, and optionally the flurosilicone polymer, optionally has a tensile strength of from 2 to 6 MPa, optionally of from 3 to 5 MPa and optionally of about 4 MPa as determined in accordance with ISO37 (test specimen S2), with an elongation at break of from 100 to 150%, optionally of from 110 t0 140% and optionally of from 120 to 130%.

A standard test specimen of the protective sleeve, and optionally the fluorosilicone polymer, optionally has a tensile strength of from 4 to 12 MPa, optionally of from 6 to 10 MPa and optionally of from 7 to 9 MPa as determined on a standard test specimen in accordance with ISO37, with an elongation at break of from 200 to 500%, optionally of from 250 to 450%, optionally of from 300 to 400% and optionally of about 350%.

The protective sleeve, and optionally the fluorosilicone polymer, optionally has a tear strength of from 5 to 40 N/mm, optionally of from 10 to 40 N/mm, optionally of from 10 to 30 N/mm and optionally of about 20 N/mm as determined in accordance with ISO34-1, test method B, procedure b.

The sleeve, and optionally the FVMQ fluorosilicone polymer, has a temperature associated with a resistance to low temperature as determined by TR10 in ISO2921 of no more than −20° C., optionally of no more than −30° C., optionally of no more than −40° C. and optionally no more than −50° C.

This composition of fluorosilicone polymer has been found to possess the favourable properties above and has also been found to cope especially well with repeated flexing, as occurs during movement of the wing tip device between ground and flight configurations.

The sleeve may be formed from a single piece of material. For example the sleeve may be moulded. The sleeve may be extruded.

The sleeve may have a first end, proximal the fixed wing, and a second end, proximal the wing tip device, such that the sleeve extends over a length of the wiring harness spanning the joint. The aircraft may be arranged such that the length of the sleeve between the first end and the second end is exposed to the external environment when the wing tip device is in the ground configuration. Aspects of the disclosure have been found to be especially beneficial in this part of the aircraft because it tends to be exposed to harsh environmental conditions. Furthermore, a sleeve and/or harness in this part of the aircraft tends to be subjected to movement, and/or changes in tensional loads.

The sleeve may be removable from the wiring harness between the first and second ends. Such an arrangement has been found to be especially beneficial because it may allow the sleeve to be installed, and/or removed, for example for replacement or repair, without needing to remove the harness. Furthermore, ensuring this particular length of the sleeve (i.e. the length spanning the joint) is removable has been found to be especially beneficial because it is this length that is most likely to be exposed to potential damage or wear. Furthermore, this length tends to be readily accessible when the wing tip device is in the ground configuration.

The sleeve may comprise a slit. The slit may extend along the length of the sleeve. The sleeve may be resiliently deformable to open the slit, such that the sleeve can be removed from the wiring harness by opening the slit around the harness.

The slit may be located on the underside of the sleeve. Such an arrangement has been found to be beneficial because it may limit water ingress and/or it may allow drainage of any moisture accumulating in the sleeve.

The sleeve may comprise a pair of closure tabs either side of the slit. The closure tabs in the pair, may be held together to close the slit. In some embodiments of the disclosure, the closure tabs may be held together by a plurality of fasteners.

The first end of the sleeve may be fixedly held in place relative to the fixed wing. The second end of the sleeve may be fixedly held in place relative to the wing tip device. The length of the sleeve therebetween may be configured to flex during movement of the wing tip device between the flight and ground configurations, thereby accommodating movement of the harness during movement between those configurations.

The first and second ends of the sleeve may be fixedly held in place by clamps. The clamps may be releasable. Such an arrangement has been found to be especially beneficial in facilitating efficient removal of the sleeve.

In some embodiments of the disclosure, the aircraft may comprise a second wiring harness extending between the fixed wing and the wing tip device, the second wiring harness comprising a plurality of conductors and being arranged to transmit electrical power and/or data to the wing tip device. It will be appreciated that aspects of the disclosure referring to ‘a wiring harness’ or ‘the wiring harness’ may also be considered as a reference to 'a first wiring harness' or 'the first wiring harness' when a second wiring harness is present. In this context, the terms 'the wiring harness' and 'the first wiring harness' may be interchangeable.

The first and second wiring harnesses may be received in the protective sleeve. The sleeve may comprise a first channel in which the first wiring harness is received. The sleeve may comprise a second channel in which the second wiring harness is received. The position of the first channel may be fixed, relative to the second channel, such that the first and second wiring harnesses are held apart. Such an arrangement has been found to be especially beneficial because it may ensure that the two harnesses do not interfere with each other during movement of the wing tip between the flight and ground configurations (thereby causing abrasion or chaffing for example). Such an arrangement may also ensure that the wiring harnesses can both be held in a relatively compact arrangement, which has been found to be especially important towards the tip of the aircraft wing.

The first wiring harness may comprise a high voltage conductor, arranged to transmit a high voltage supply. The high voltage supply may be at least 240V DC. The high voltage supply may be up to 270V DC. The high voltage supply may be up to 300V DC. The high voltage supply may be 270V DC. Aspects of the disclosure may be especially beneficial when a wiring harness is used for a high voltage supply because the presence of the high voltage creates specific safety requirements. For example, to minimise risk of arcing the high voltage supply must be kept a minimum distance away from other electrical wiring, and must also be kept a minimum distance away from adjacent aircraft structure. The use of the protective sleeve of the present disclosure may allow the high voltage wiring harness to be placed closer to other wiring. In particular, where a second wiring harness is received in a second channel in the sleeve and the first and second channels are held apart, the sleeve ensures that those two harnesses cannot touch. By providing the high voltage wiring harness in the protective sleeve, the risk of arcing to adjacent structure is also reduced, thereby allowing use of the wiring harness in the confined volume of the wing tip.

In arrangements comprising a second wiring harness, the second wiring harness may comprise a low voltage conductor arranged to transmit a low voltage supply. The low voltage supply may be less than 40V DC. The low voltage supply may be 28V or less.

The sleeve may comprise a webbing region. The webbing region may extend between the first and second channels and may be arranged to hold the channels in the fixed position relative to one another. The webbing region may provide an air gap between the first and second channels.

The sleeve may be arranged such that the first wiring harness is spaced apart from the second wiring harness by less than 75 mm, and more preferably by less than 50 mm. The sleeve may be arranged such that the first wiring harness is spaced apart from the second wiring harness by 25 mm or less.

The sleeve may comprise a wall substantially surrounding the, or each, wiring harness. The wall may have a wall thickness of at least 0.79 mm. This has been found to be the minimum thickness required to ensure arc protection when the sleeve comprises an FVMQ material. The wall thickness may be at least 1 mm, and more preferably at least 2 mm. The wall may have a wall thickness of less than 5 mm. In embodiments of the disclosure comprising channels for receiving the harness(es), the channel may be defined by the wall.

In embodiments comprising the first and second channels, the sleeve may comprise a first slit extending along the length of the first channel and a second slit extending along the length of the second channel. The sleeve may be resiliently deformable to open the first and second slits, such that the sleeve can be removed from the first and second wiring harnesses by opening the first and second slits around the respective first and second wiring harnesses.

The aircraft may comprise a sleeve guide. The sleeve guide may be located above the sleeve. The sleeve guide may be configured to constrain movement of the sleeve such that the sleeve bends about the sleeve guide during movement of the wing tip device from the flight configuration to the ground configuration. Such an arrangement may be beneficial because it tends to ensure a predictable locus of movement of the sleeve during movement of the wing tip from the flight to ground configurations. The risks of the wiring harnesses coming too close to adjacent structure is therefore reduced.

When the wing tip device is in the flight configuration, the sleeve may be in contact with the sleeve guide and the sleeve is more preferably urged against the sleeve guide. The sleeve may be biased against the sleeve guide. Such an arrangement may be beneficial because it mitigates vibrational movement of the sleeve (which would otherwise risk undue wear to the sleeve).

The aircraft may comprise a second sleeve guide. The second sleeve guide may be located below the sleeve. The second sleeve guide may be configured to constrain movement of the sleeve such that the sleeve bends about the sleeve guide during movement of the wing tip device from the ground configuration to the flight configuration. Such an arrangement may be beneficial because it tends to ensure a predictable locus of movement of the sleeve during movement of the wing tip from the ground to the flight configuration.

In the flight configuration the sleeve may be in contact with the sleeve guide and is more preferably urged against the second sleeve guide. Such an arrangement may be beneficial because it mitigates vibrational movement of the sleeve.

The combination of the first and second sleeve guides has been found to be especially beneficial because it may allow a predictable locus of movement of the sleeve during movement of the wing tip in both directions between the ground to the flight configuration.

The sleeve guides may be offset in a vertical direction from a line joining each end of the sleeve. In this manner, the sleeve may be fed between the two sleeve guides in such a way that the sleeve is naturally urged against both sleeve guides, thereby constraining vibrational movement.

At least one, and preferably both, the sleeve guides are associated with the fixed wing. The, or each, sleeve guide may be mounted on the fixed wing and fixed relative thereto.

According to another aspect of the invention, there is provided a sleeve for receiving a first wiring harness including plurality of high-voltage cables and a second wiring harness including a plurality of low voltage cables. The sleeve may be formed from fluorosilicone polymer. The wiring harnesses extend between a fixed wing and a moveable wing tip device on an aircraft. The sleeve comprises a first, circular, channel for receiving the first wiring harness and a second, circular, channel for receiving the second wiring harness. The two channels are coupled such that each wiring harness is substantially prevented from moving towards or away from the adjacent wiring harness. The sleeve includes a slit along each channel such that the sleeve may be removed from the harnesses.

Each of the plurality of conductors in the wiring harness is preferably a sheathed conductor. Each of the conductors may take a number of forms depending on its use. The conductor may be a wire, but is more preferably a cable. For example the conductor may be a single core cable, or a multi-core cable. The first and/or second wiring harnesses may each comprise a multiplicity of conductors.

The sleeve is arranged to protect the wiring harness. The sleeve may substantially enclose the wiring harness.

The aircraft may comprise a first assembly comprising a sleeve and a wiring harness as described with reference to any of the aspects above, and a second assembly comprising a sleeve and a wiring harness as described with reference to any of the aspects above. The second assembly may be arranged as a back-up assembly in the event of failure of the first assembly. One of the assemblies may be located towards the leading edge of the wing. The other of the assemblies may be located towards the trailing edge of the wing.

The fixed wing may have an upper surface and a lower surface. The wing tip device may have an upper surface and a lower surface. In the flight configuration, the upper and lower surfaces of the wing tip device may be continuations of the upper and lower surfaces of the fixed wing. In the flight configuration, the trailing edge of the wing tip device may be a continuation of the trailing edge of the fixed wing. The leading edge of the wing tip device may be a continuation of the leading edge of the fixed wing. It may be that there is a smooth transition from the fixed wing to the wing tip device. It will be appreciated that there may be a smooth transition even when the shape of the wing is such that there are changes in sweep or twist at the junction between the fixed wing and wing tip device. It may be that there are no discontinuities at the junction between the fixed wing and wing tip device.

It may be that rotation of the wing tip device from the flight configuration to the ground configuration comprises upward rotation of the wing tip device relative to the fixed wing. In this way, the wing may comply with an airport compatibility gate limit, while also maintaining a reasonable ground clearance.

In the flight configuration, the span of the wing may exceed an airport compatibility gate limit. In the ground configuration the span is reduced such that the span (with the wing tip device in the ground configuration) is less than, or substantially equal to, the airport compatibility gate limit. In the ground configuration, the wing tip device may be positioned such that the wing has its shortest span. In the ground configuration, the wing tip device may be oriented substantially vertical.

It may be that the wing tip device rotates in a first direction from the ground configuration to the flight configuration. It may be that the wing tip device rotates in a second direction, opposite to the first direction, from the flight configuration to the ground configuration.

The wing tip device may be a wing tip extension, for example a generally planar tip extension. In other embodiments, the wing tip device may comprise, or consist of, a non-planar device, such as a winglet. The wing tip device may comprise a further wing section having a further movable wing tip device at its distal end. The ordinarily skilled person will be aware of other devices suitable for movably placing at the wing tip. The wing tip device may include, for example, trailing edge moveable devices for control (ailerons) or leading edge devices for stall protection, such as slats or droop nose devices.

The span ratio of the fixed wing relative to the wing tip device may be such that the fixed wing comprises at least 60%, 70%, 80%, 90%, or more, of the overall span of the wing.

When the wing tip device is in the ground configuration, the aircraft may be unsuitable for flight. For example, the wing tip device may be aerodynamically and/or structurally unsuitable for flight in the ground configuration. The aircraft is preferably configured such that, during flight, the wing tip device is not moveable to the ground configuration. The aircraft may comprise a sensor for sensing when the aircraft is in flight. When the sensor senses that the aircraft is in flight, a control system is preferably arranged to disable the possibility of moving the wing tip device to the ground configuration. In the ground configuration the wing tip device may be held in place. For example the wing tip device may be latched or locked in place to prevent movement back towards the flight configuration.

The aircraft may comprise an actuator for moving the wing tip device between the flight configuration and the ground configuration.

The wing tip device is moveably mounted at a joint at the end of the fixed wing. The joint may be a hinge joint. The joint may comprise a plurality of lugs. A hinge axis may pass through the plurality of lugs, the wing tip device being rotatable about said hinge axis, between the flight and ground configurations.

The aircraft may be a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and optionally more than 75 passengers. The aircraft may be a commercial aircraft, for example a commercial passenger aircraft, for example a single aisle or twin aisle aircraft. The aircraft need not be configured for carrying passengers, but could for example be an aircraft of an equivalent size configured for cargo and/or used on a non-commercial basis. The aircraft may have a maximum take-off weight (MTOW) of at least 20 tonnes, optionally at least 40 tonnes, and possibly 50 tonnes or more. The aircraft may have an operating empty weight of at least 20 tonnes, optionally at least 30 tonnes, and possibly about 40 tonnes or more.

It will of course be appreciated that features described in relation to one aspect of the present disclosure may be incorporated into any and all other aspects of the present disclosure. For example, features described in relation to an embodiment having a first and second wiring harness, may also be applicable to an embodiment specifying only a first wiring harness and vice versa. Furthermore, the method of the disclosure may incorporate any of the features described with reference to the apparatus of the disclosure and vice versa.

DESCRIPTION OF THE DRAWINGS

Embodiments of the present disclosure will now be described by way of example only with reference to the accompanying schematic drawings of which.

DETAILED DESCRIPTION

Figure 1A:
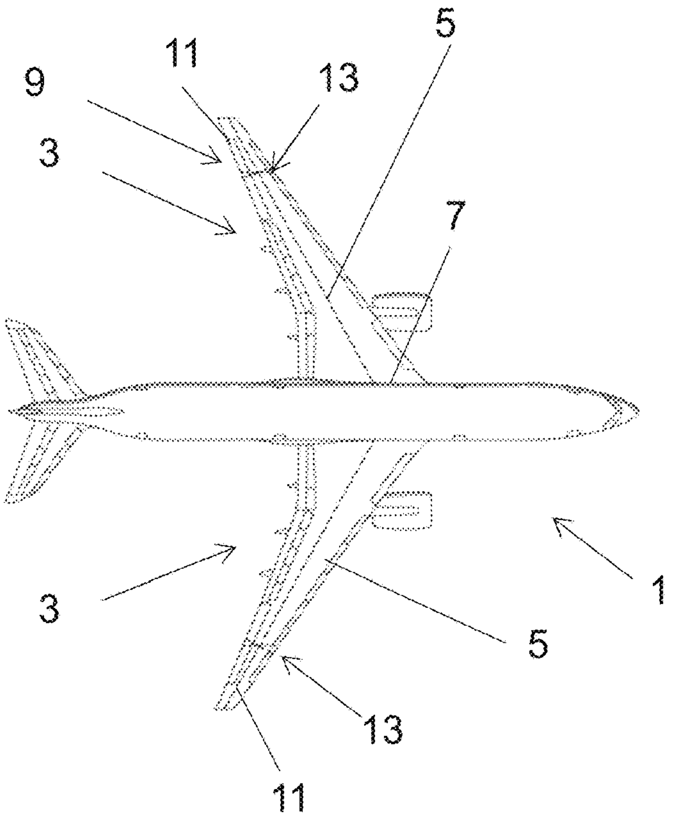
FIGS. 1A and 1B shows a plan view and a frontal view respectively, of an aircraft according to a first embodiment of the invention.
Figure 1B:
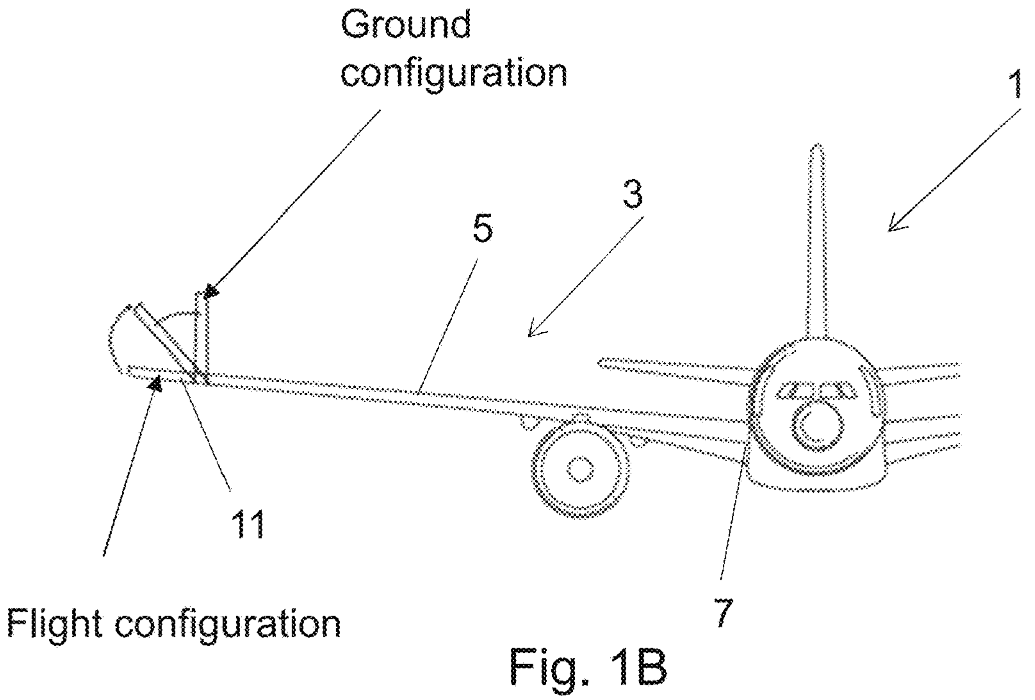

Referring first to FIGS. 1A and 1B, these figures show a plan view and a front view of an aircraft 1 according to a first embodiment. The aircraft 1 comprises two main wings 3 extending outwardly from the fuselage (one wing is not fully visible in FIG. 1B). Each wing 3 comprises a fixed wing 5 extending from the root 7 to the tip 9. At the tip 9 of the fixed wing 5, the wing 3 also comprises a moveable wing tip device 11. In this embodiment, the wing tip device 11 comprises a planar wing tip extension. The wing tip device 11 is rotatably mounted on a hinge joint 13, having a hinge axis. As such, the wing tip device 11 is able to rotate about the hinge joint 13 relative to the fixed wing 5.

The aircraft 1 also comprises an actuator assembly (not shown) operable to rotate the wing tip device 7 about the hinge joint 13. Referring to FIG. 1B, the wing tip device 11 is rotatable about the hinge joint 13 between a flight configuration, and a ground configuration. FIG. 1B also shows the wing tip device 11 when moving part-way between these two configurations.

In the flight configuration, the wing tip device 11 is an extension of the fixed wing 5. Accordingly, the upper and lower surfaces of the fixed wing 5 are continuous with the upper and lower surfaces of the wing tip device 11. The leading and trailing edges of the fixed wing 5 are also continuous with the respective leading and trailing edges of the wing tip device 11 (see FIG. 1A). Such an arrangement is beneficial as it provides a relatively large wing span during flight, thereby providing an aerodynamically efficient aircraft.

The wing tip device 11 is rotatable, upwards, from the flight configuration to a ground configuration in which the wing tip device 11 is rotated, to a substantially upright position (shown in FIG. 1B). The wing tip device 11 is moveable to this configuration when the aircraft 1 is on the ground. Once rotated to such a position, the span of the aircraft 1 is sufficient to meet airport compatibility gate limits. Thus, the aircraft 1 of the first embodiment can have a large span (exceeding gate limits) during flight, but is still able to comply with gate limits when on the ground.

Aspects of the present disclosure relate to the wiring harnesses extending from the fixed wing 5 into the wing tip device 11. This will now be described in more detail with reference to FIGS. 2A and 2B.

Figure 2A:
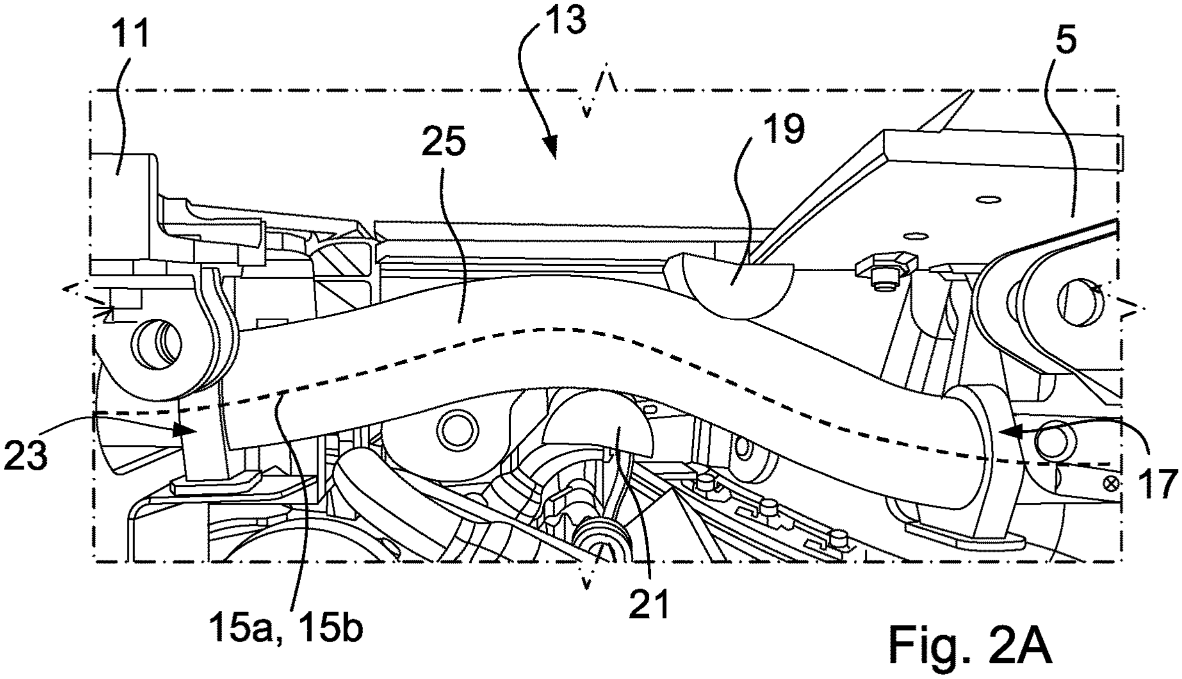
FIGS. 2A and 2B show a cut-away view of the leading edge of the wing at the joint between the fixed wing and the wing tip device of the first embodiment, when the wing tip device is in the flight and ground configurations respectively.

FIG. 2A is a view of the leading edge of the wing, at hinge joint 13 but with some of the wing structure (namely the wing skin around the leading edge) removed for clarity. Two wiring harnesses **15*a* and 15*b*, located within the inside of the fixed wing, and each extend from the fuselage to the tip 9 of the fixed wing 5. The route of the wiring harnesses 15*a/b* is illustrated schematically using the dashed-line, as the harnesses themselves are mostly hidden by surrounding structure and are aligned one behind the other in the view shown. The wiring harnesses 15*a* and 15*b*, as is known in wiring harnesses per se in the art, each contain a multiplicity of sheathed electrical cables (not shown individually in the Figures). Each of the electrical cables performs a different function (for example, to supply electrical power to different devices in the aircraft, or to transmit data signals to/from sensors and devices in the aircraft). The cables are collected together in an assembly to form each harness, that is then routed in a suitable manner through the wing. The two harnesses 15*a*, 15*b*** extend largely parallel to each other.

FIG. 2A shows the aircraft with the wing tip device 11 in the flight configuration. The wiring harnesses **15*a/b* emerge from the fixed wing at a first end 17, and then cross the hinge joint 13 via a bend between two sleeve guides 19 and 21 (described in further detail below). The harnesses 15*a/b* enter the wing tip device 11 at a second end 23, and then continue into the wing tip device 11** where the cables then connect to a variety of devices and sensors.

Figure 2B:
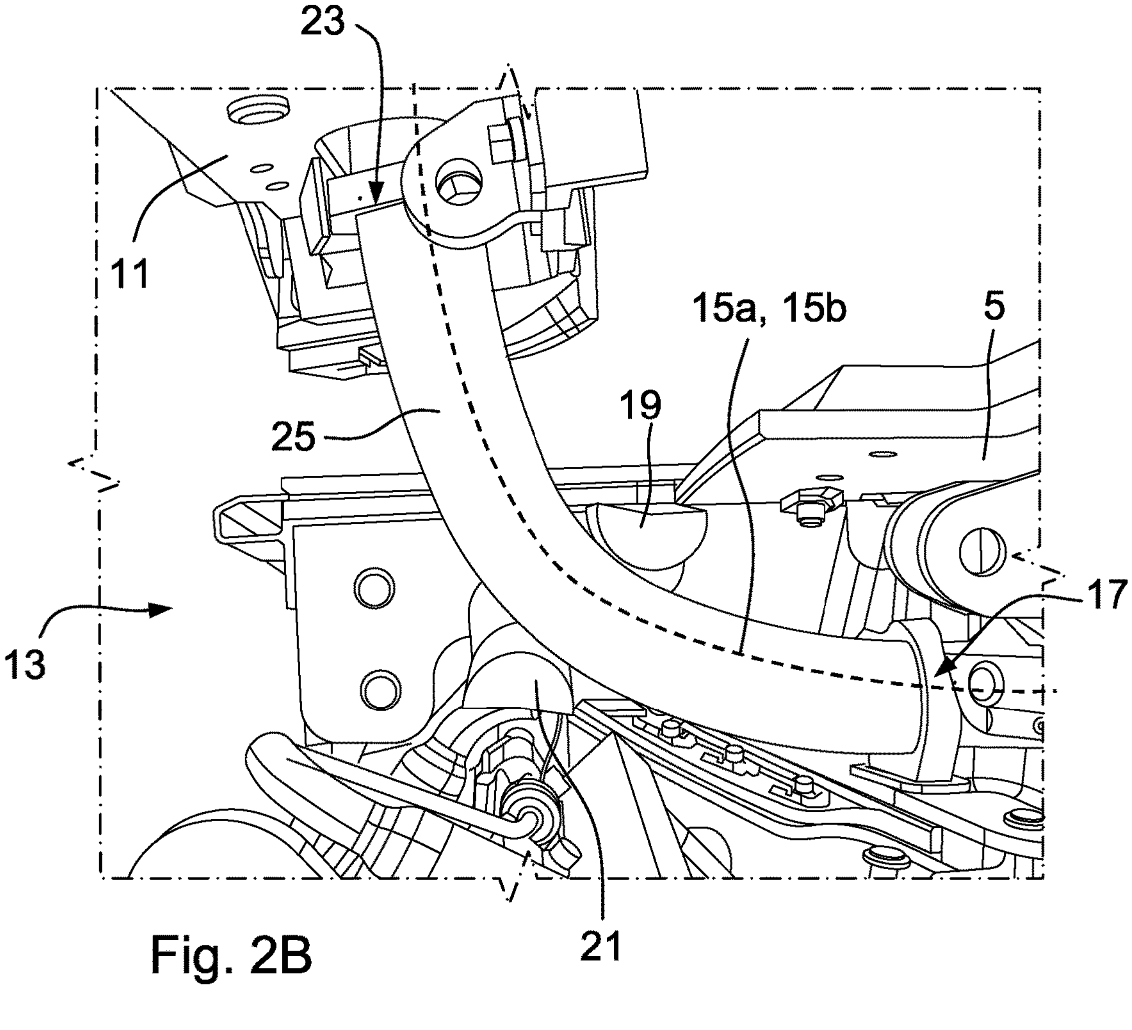

FIG. 2B shows the aircraft with the wing tip device 11 in the ground configuration. As can be seen from a comparison with FIG. 2A, the first end 17 remains fixed relative to the fixed wing 5 and the second end 23 remains fixed relative to the wing tip device 11. Across the joint 13, the wiring harnesses flex into an upward curve, but remain between the sleeve guides 19 and 21.

Figure 5:
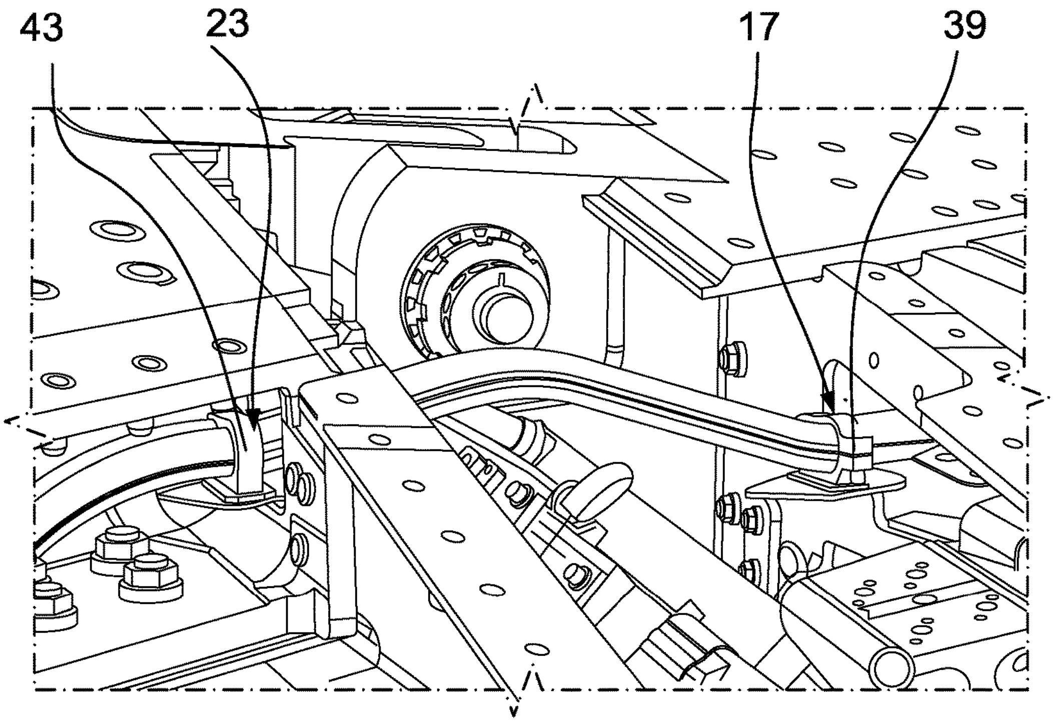
FIG. 5 is a perspective cut away view of the trailing edge, at the joint in the aircraft of the first embodiment.
Figure 6A:
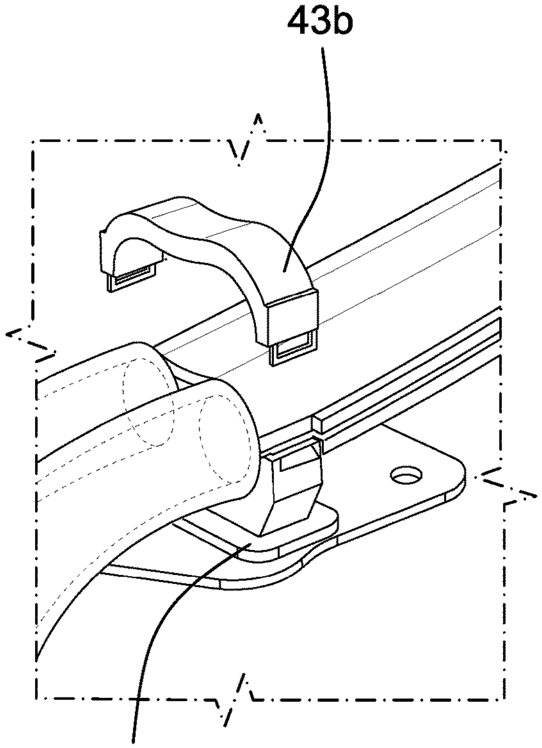
FIGS. 6A and 6B are the zoomed in views of either end of the sleeve.

FIGS. 2A and 2B show the leading edge of the wing. However, another pair of harnesses and a corresponding sleeve is also present at the trailing edge. These are shown in FIG. 5 and FIG. 6A/6B. The arrangement of harnesses at both the leading and trailing edges ensures redundancy should one of the arrangements fail. The arrangement at the leading edge is broadly identical to the arrangement described at the trailing edge (other than any differences discussed herein). For clarity, aspects of the invention are described below with reference to one of the sleeves, but those aspects are equally applicable to the other sleeve unless indicated otherwise.

In general terms, placing wiring harnesses across this joint 13 between the fixed wing 5 and the moveable wing tip device 11 presents a number of challenges. The arrangement in the aircraft of the first embodiment seeks to address these challenges. In that respect, the aircraft includes a protective sleeve 25 at both the leading and trailing edges that surrounds the respective wiring harnesses **15*a/b* as they extend across the joint. A sleeve 25** and its features will now be described in more detail.

The sleeve 25 at the leading edge (see FIGS. 2A and 2B) extends from the first end 17 (where the harnesses **15*a/b* emerge from the fixed wing 5) to the second end 23 (where the harnesses 15*a/b* enter the wing tip device 11**). The region between these two end locations has been found to be especially exposed to potentially harsh environmental conditions (for example extremes of temperature, potentially aggressive substances such as grease, oil, de-icing fluid etc.). Furthermore, as the wing tip device moves between the flight and ground configurations, the sleeve flexes to accommodate this movement, and may therefore be susceptible to fatigue wear.

In the first embodiment of the invention, the sleeve is made of a fluorosilicone polymer known as FVMQ. The fluorosilicone polymer has a hardness as measured on the Shore A hardness scale of about 70. Such a hardness may be particularly effective in dealing with the multiple bending and unbending procedures to which a folding wingtip is subjected. In addition, the FVMQ material has been found to be especially robust in coping with the harsh environmental conditions that it may be exposed to at the tip of the wing.

Another, synergistic, benefit of using a sleeve made from FMVQ is that it allows the sleeve to accommodate two longitudinally extending slits 27, 29 such that the sleeve can readily be installed and removed. These slits are shown in FIGS. 3 and 4A/4B to which reference is now made.

Figure 3:
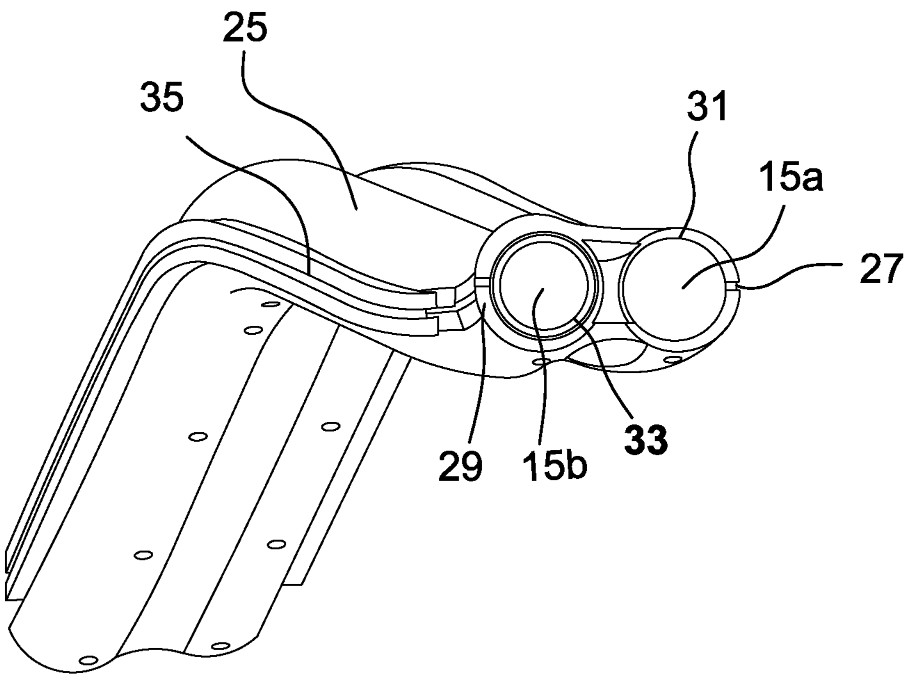
FIG. 3 is an isolated perspective view of the wiring harnesses and the sleeve at the trailing edge in the aircraft of the first embodiment, the internal layout of the sleeve being shown in cross-section.
Figure 4A:
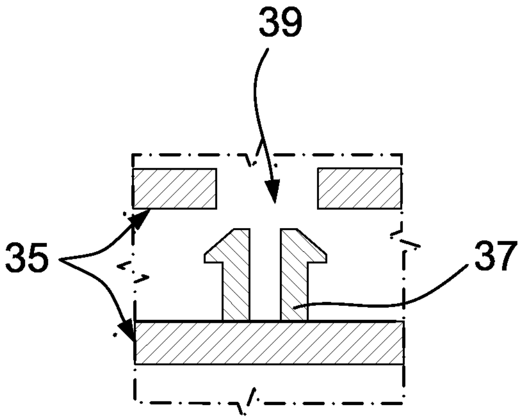
FIGS. 4A and 4B show the arrangement of closure tabs on the sleeve in FIG. 3.

Referring first to FIG. 3 which shows the sleeve located at the trailing edge, the sleeve 25 comprises a first channel 31 in which the first harness 15*a* is received, and a second channel 33 in which the second harness 15*b* is received. A first slit 27 extends along the side of the sleeve 25 and extends the full length of the first channel 31. A corresponding slit 29 is located on the opposing side of the second channel 33 and also runs the full length of the sleeve.

Figure 6B:
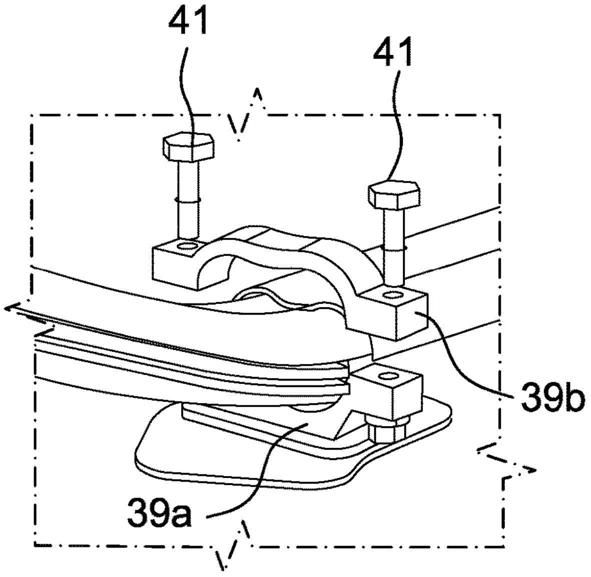

The flexibility of the FVMQ material allows the sleeve to resiliently deform to open each slit. Accordingly, each harness 15*a*/15*b* can be removed from its respective channel by peeling the slit open and pulling the sleeve away from the harness. To install the sleeve, the reverse motion is also possible. More details regarding the installation and removal of the sleeve are provided with reference to FIGS. 5 to 7 below.

Figure 4B:
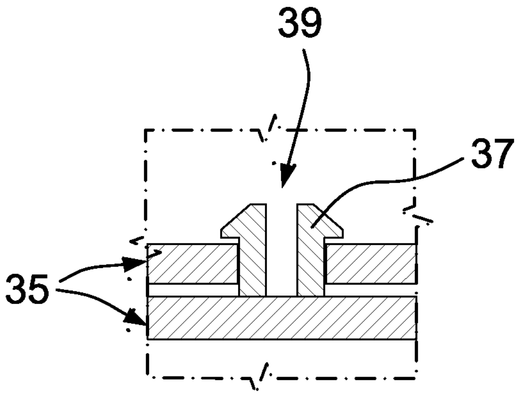

To ensure the sleeve maintains its protective function, the sleeve comprises a pair of closure tabs 35 extending either side of each slit. The closure tabs 35 are held together by a series of releasable fasteners 37. This is illustrated in FIGS. 4A and 4B, which show a pair of closure tabs 35 open (FIG. 4A) and closed (FIG. 4B). One of the tabs in each pair has a series of integrally moulded fasteners 37 along its length (only one being visible in FIGS. 4A and 4B). These fasteners 37 include a mushroom head which can be inserted into a corresponding opening 39 on the opposing closure tab (see FIG. 4B). Once inserted through the opening, the fastener 37 securely holds the closure tabs 35 together. Each fastener 37 is nonetheless able to be extracted from the opening 39 when necessary, for example to open the slit, due to the resiliently deformable nature of the sleeve material.

As mentioned above, the sleeve 25 is removeable from the harnesses 15*a/b*, via the slits 27, 29. Importantly, the sleeve 25 is also a relatively short length and only extends between either of the ends across the joint. Referring now to FIG. 5 and the zoomed-in views (FIGS. 6A and 6B) of either end of the sleeve, a first end 17 of the sleeve 25 is fixedly held in place by a first clamp 39. The first clamp 39 comprises a base portion 39*a* mounted on the fixed wing 5, and a clamping portion 39*b* arranged to fixedly hold the end of the sleeve in place. The clamping portion 39*b* is held in place via two screw threaded fastenings 41. The second end 23 of the sleeve 25 is fixedly held in place by a second clamp 43. This clamp 43 also comprises a base portion 43*a*, but it is instead mounted on the wing tip device 11. The second clamp 43 also comprises a clamping portion 43*b*, but instead of screw headed fastenings, this clamp is held together via a snap fit, and can be removed using a suitable tool. In other embodiments, each end may be held in place by clamps of the same design both ends. In the above-mentioned embodiment the clamping portions and the base portions are formed from a plastics material.

To remove the sleeve, each clamp 39, 43 is released, and then the sleeve 25 is pulled away from each harness via the slits in the manner described above.

Having a removeable sleeve has been found to be especially beneficial because it may allow the sleeve to be installed, and/or removed, for example for replacement or repair, without needing to remove the harness. Furthermore, ensuring this particular length of the sleeve (i.e. the length spanning the joint) is removable has been found to be especially beneficial because it is this length that is most likely to be exposed to potential damage or wear. Furthermore, this length tends to be readily accessible when the wing tip device is in the ground configuration.

Figure 7A:
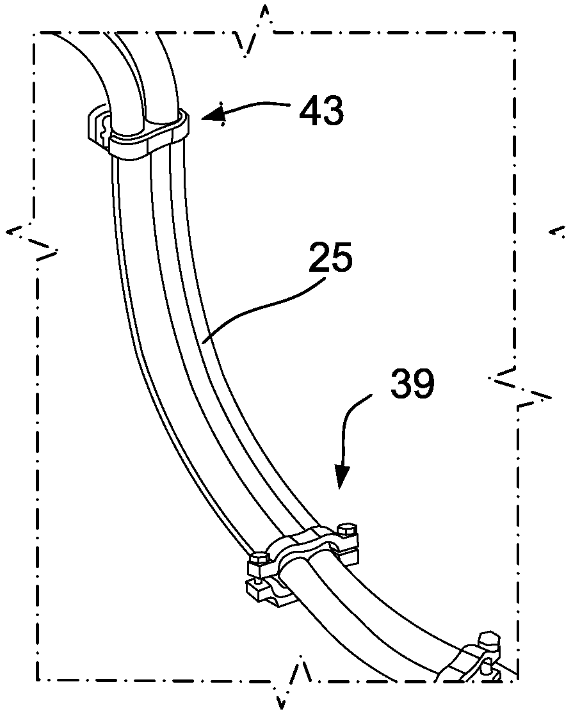
FIGS. 7A to 7D are isolated perspective views of the sleeve in the first embodiment, during stages of removing and replacing a damaged sleeve.
Figure 7B:
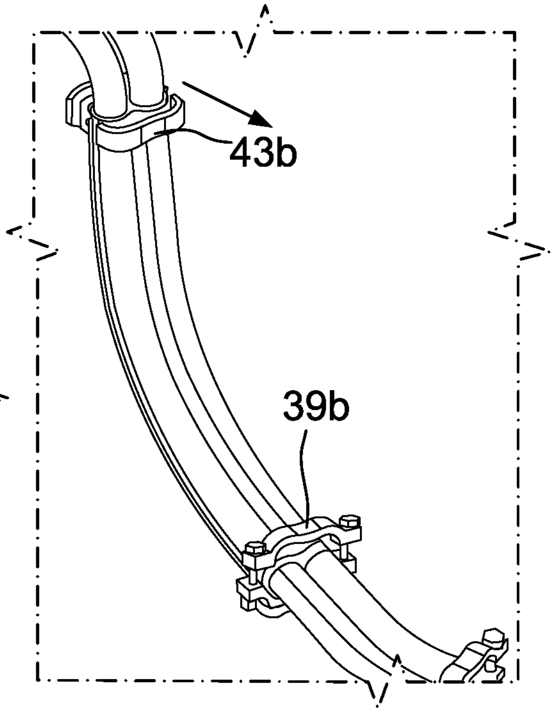

A method of removing the sleeve is illustrated schematically in FIGS. 7A to 7D. FIG. 7A shows the sleeve 25 installed on two harnesses 15*a*, 15*b* and fixedly held in place with clamps 39, 43. For multiple reasons, the sleeve may require replacement or repair, in which case it may be beneficial to remove the sleeve from the harnesses. While the movement of the wing tip device is not shown, an initial step of servicing the harness is to move the wing tip device to a ground configuration, shown by the relative position of the clamps in FIGS. 7A to 7D. This may provide easier access to the sleeve and/or clamps compared to when the wing tip device is in the flight configuration.

Figure 7C:
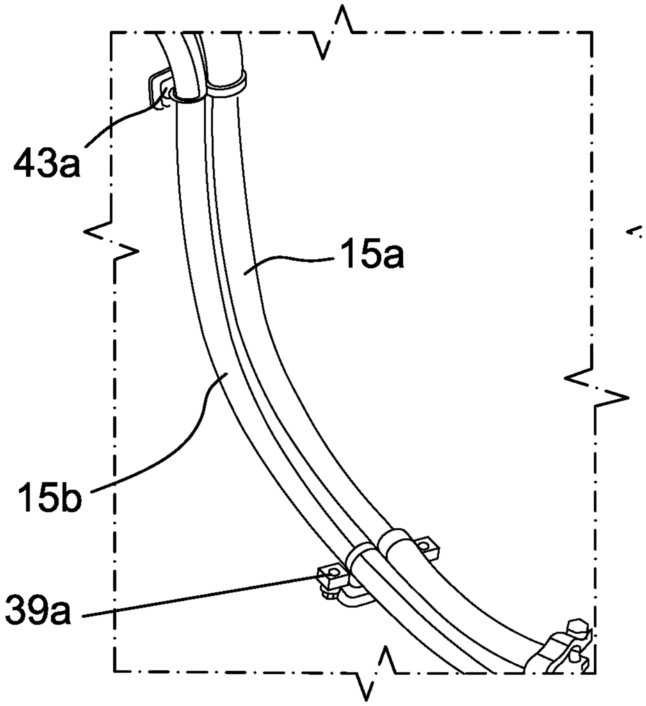
Figure 7D:
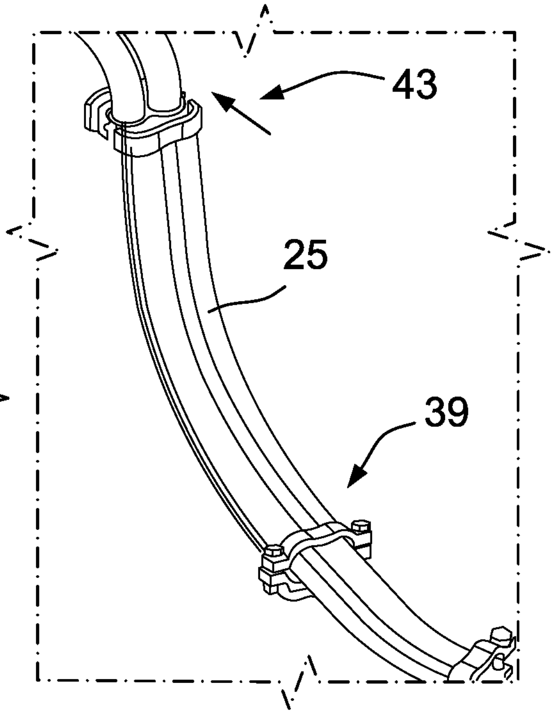

Referring to 7B, a next step in removing the sleeve is to unclamp the ends of the sleeve by separating the clamping portions 39*b*, 43*b* from their respective base portions 39*a*, 43*a*. Unclamping the ends of the sleeve allows for removal of the sleeve, by removing each harness from its respective channel by peeling the slits open and pulling the sleeve away from each harness. Such removal results in the harnesses 15*a*, 15*b* being exposed and resting on the base portions 39*a*, 43*a*, as shown in FIG. 7C. The original sleeve may then be repaired or replaced with a new sleeve. To fit a replacement/repaired protective sleeve, the process is effectively reversed. The slits of the new/repaired sleeve are peeled open and pushed around each harness. With the sleeve 25 installed on the harnesses 15*a*, 15*b*, the ends are then re-clamped as shown in FIG. 7D, by reuniting the clamping portions 39*b*, 43*b* with the base portions 39*a*, 43*a*.

Referring back to FIGS. 2A and 2B, the aircraft (at both the leading edge and the trailing edge) comprises an upper sleeve guide 19 and a lower sleeve guide 21. Both of these guides are mounted onto the fixed wing and are offset in a vertical direction from a line joining each end 17,23 of the sleeve (when the wing tip device is in the flight configuration). In this manner, the sleeve is fed between the two sleeve guides 19, 21 and the natural resilience of the sleeve is such that it is urged against both sleeve guides. This constrains vibrational movement, and therefore minimises the risk of damage arising due to vibration/movement of the sleeve. The sleeve guides 19, 21 also act to constrain the movement of the sleeve 25 as it flexes during movement of the wing tip device 11 between the flight and ground configurations. As illustrated in FIGS. 2A and 2B, the upper sleeve guide 19 fixes the location about which the sleeve 25 bends upwardly during movement to the ground configuration. Likewise, the lower sleeve guide 21 fixed the location about which the sleeve 25 bends downwardly during movement to the flight configuration.

Figure 8:
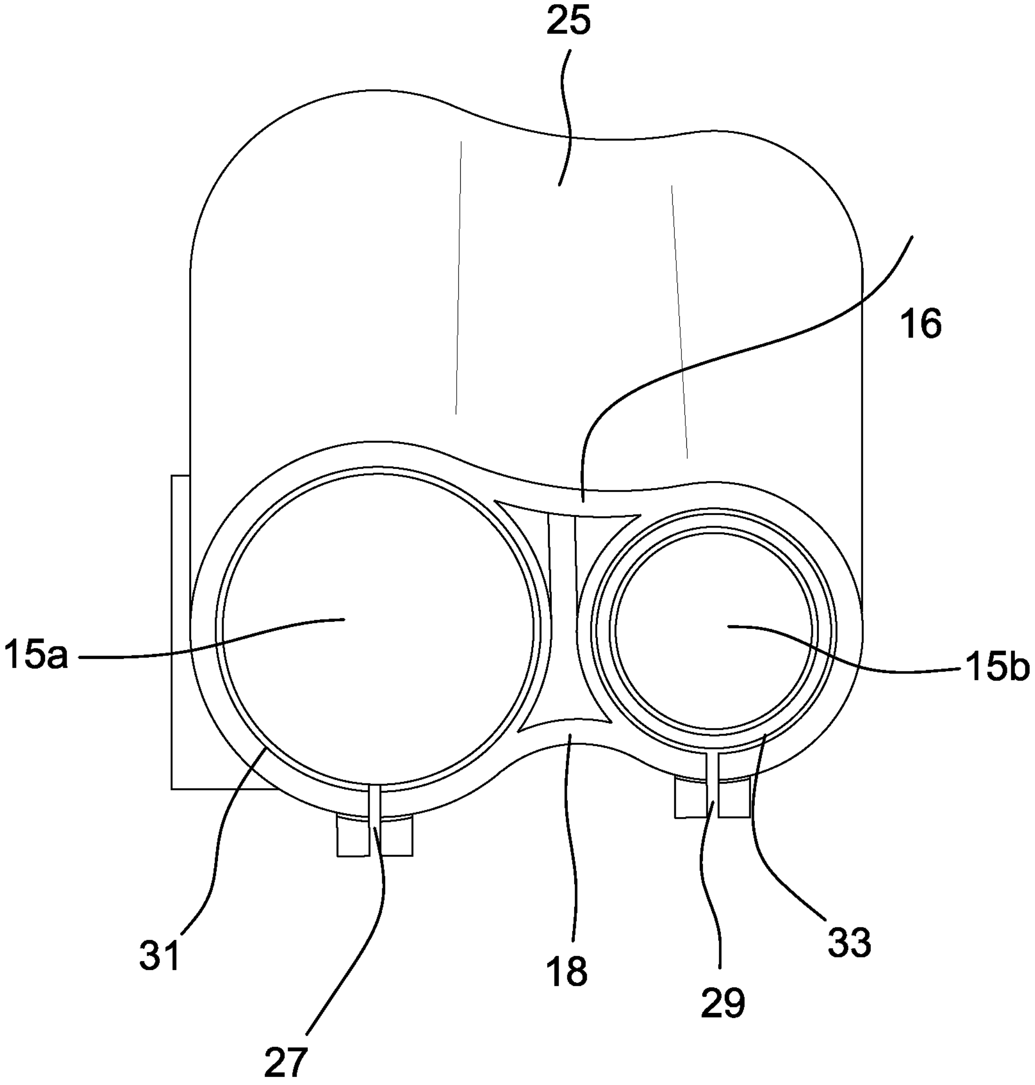
FIG. 8 is a cross-sectional view through the sleeve at the leading edge (as shown in FIGS. 2A and 2B).

FIG. 8 shows a cross-sectional view through the sleeve that is positioned at the leading edge of the wing (i.e. as shown in FIGS. 2A and 2B). Where appropriate, the same reference numerals are used to describe corresponding features from the sleeve that is positioned at the trailing edge. In the arrangement of FIG. 8, the sleeve 25 comprises a first channel 31 in which the first harness 15*a* is received, and a second channel 33 in which the second harness 15*b* is received. A first slit 27 extends along the base of the first channel 31, and extends the full length of the sleeve 25. A corresponding slit 29 is located along the base of the second channel 33 and also runs the full length of the sleeve 25.

In contrast to the arrangement at the trailing edge, the slits are both located on the underside of the sleeve (rather than the side). Such an arrangement has been found to be beneficial because it ensures any moisture that my accumulate inside the sleeve, is able to drain out through the slit.

The sleeve 25 at the leading edge and the sleeve 25 at the trailing edge both have a similar profile shape in cross section and that will now be described with reference to the leading edge sleeve 25 shown in FIG. 8.

In the first embodiment, the first harness 15*a* contains high voltage cables for transmitting a high voltage (270V) supply, whereas the second harness 15*b* contains only low voltage cables arranged to transmit a low voltage (28V) supply and data signals. The presence of a high voltage conductor presents some specific challenges. In particular, there is a need to minimise the risk of arcing, and to minimise the risk of scenarios that might create an arcing risk. The sleeve in this embodiment has some features to address those challenges. Firstly, each channel 31/33 has a circular profile. This minimises the electrical footprint and maximises the clearance with surrounding structures (and the respective other channel). Secondly, the sleeve 25 is a single piece construction in which the position of the first channel 31 is fixed relative to the second channel 33 (by the webbing portions 16, 18). This ensures that the first and second wiring harnesses 15*a*, 15*b* are consistently held apart, thereby preventing contact between the two harnesses and also minimising the risk of the two harnesses rubbing against one another in a manner that might cause wear and tear (which would also then create a potential arcing risk). By using a sleeve 25 in this manner, the harnesses 15*a*/15*b* can be positioned significantly closer to one another than a scenario in which they are held in separate, independent sleeves. This is especially beneficial in the area of the wing tip where space is at a premium.

Each channel 31/33 includes a small tolerance between the outer diameter of the harness and the inner diameter of the channel. This minimises chaffing between the harness and the sleeve 25.

The sleeve surrounding the circular channels 31/33 is 3 mm thick, which is well above the thickness required to ensure arcing protection. It has been found that a thickness of at least 0.79 mm of the FVMQ material is required to ensure arc protection.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft comprising a wing, the wing comprising a fixed wing and a wing tip device moveably mounted at a joint at an end of the fixed wing, wherein the wing tip device is moveable about the joint between: (i) a flight configuration for use during flight, and (ii) a ground configuration for use during ground-based operations, wherein in the ground configuration, the wing tip device is moved relative to the fixed wing such that an span of the wing is reduced, wherein the aircraft comprises a first wiring harness and a second wiring harness, the first and second wiring harnesses extending between the fixed wing and the wing tip device, and each of the first and second wiring harnesses comprising a plurality of conductors arranged to transmit electrical power and/or data to the wing tip device, and wherein the first and second wiring harnesses are received in a protective sleeve, the sleeve comprising a first channel in which the first wiring harness is received and a second channel in which the second wiring harness is received, a position of the first channel is fixed, relative to the second channel, such that the first and second wiring harnesses are held apart, wherein the plurality of the conductors of the first wiring harness comprises a high voltage conductor, arranged to transmit a high voltage supply, wherein the plurality of the conductors of the second wiring harness comprises a low voltage conductor arranged to transmit a low voltage supply, and wherein the first wiring harness and the second wiring harness are spaced apart and extend parallel to each other.

2. The aircraft according to claim 1, wherein the sleeve is formed from a single piece of material and the first and second channels are integrally formed within the sleeve.

3. The aircraft according to claim 1, wherein each channel is substantially circular in cross-section.

4. The aircraft according to claim 1, wherein the sleeve comprises a webbing region, the webbing region extending between the first and second channels and providing an air gap therebetween, and arranged to hold the channels in the fixed position relative to one another.

5. The aircraft according to claim 1, wherein the sleeve is arranged such that the first wiring harness is spaced apart from the second wiring harness by less than 75 mm.

6. The aircraft according to claim 1, wherein each channel is defined by a wall surrounding the respective wiring harness, the wall having a wall thickness of at least 2 mm.

7. The aircraft according to claim 1, wherein the sleeve comprises a first slit extending along a length of the first channel and a second slit extending along a length of the second channel, the sleeve resiliently deformable to open the slits, such that the sleeve can be removed from the first and second wiring harnesses by opening the first and second slits around the respective first and second wiring harnesses.

8. The aircraft according to claim 7, wherein the slits are located on underside of the sleeve.

9. The aircraft according to claim 7, wherein the sleeve comprises a first pair of closure tabs on either side of the first slit, and a second pair of closure tabs on either side of the second slit, the closure tabs of each pair are held together to close the respective slit.

10. The aircraft according to claim 1, wherein the aircraft comprises a sleeve guide located above the sleeve, and wherein the sleeve guide is configured to constrain movement of the sleeve such that the sleeve bends about the sleeve guide during movement of the wing tip device from the flight configuration to the ground configuration.

11. The aircraft according to claim 10, wherein when the wing tip device is in the flight configuration, the sleeve is urged against the sleeve guide.

12. The aircraft according to claim 10, wherein the aircraft comprises a second sleeve guide, the second sleeve guide being located below the sleeve and wherein in the flight configuration the sleeve is urged against the second sleeve guide.

13. A wing assembly for the aircraft according to claim 1, the wing assembly comprising a second fixed wing and a second wing tip device moveably mounted at a second joint at an end of the second fixed wing, the second wing tip device moveable about the second joint between the flight and the ground configurations, wherein the wing assembly comprises a third wiring harness and a fourth wiring harness, the third and fourth wiring harnesses extending between the second fixed wing and the second wing tip device, and each of the third and fourth wiring harnesses comprising a plurality of conductors arranged to transmit electrical power and/or data to the second wing tip device, and wherein the third and fourth wiring harnesses are received in a second protective sleeve, the second protective sleeve comprising a third channel in which the third wiring harness is received and a fourth channel in which the fourth wiring harness is received, a position of the third channel is fixed, relative to the fourth channel, such that the thin and fourth wiring harnesses are held apart.

14. An aircraft comprising a wing, the wing comprising a fixed wing and a wing tip device moveably mounted at a joint at an end of the fixed wing, wherein the wing tip device is moveable about the joint between: (i) a flight configuration for use during flight, and (ii) a ground configuration for use during ground-based operations, wherein in the ground configuration, the wing tip device is moved relative to the fixed wing such that an span of the wing is reduced, wherein the aircraft comprises a first wiring harness and a second wiring harness, the first and second wiring harnesses extending between the fixed wing and the wing tip device, and each of the first and second wiring harnesses comprising a plurality of conductors arranged to transmit electrical power and/or data to the wing tip device, wherein the first and second wiring harnesses are received in a protective sleeve, the sleeve comprising a first channel in which the first wiring harness is received and a second channel in which the second wiring harness is received, a position of the first channel is fixed, relative to the second channel, such that the first and second wiring harnesses are held apart and extend largely-parallel to each other, and wherein the aircraft comprises a first sleeve guide and a second sleeve guide offset horizontally from the first sleeve guide.

15. An aircraft comprising a wing, the wing comprising a fixed wing and a wing tip device moveably mounted at a joint at an end of the fixed wing, wherein the wing tip device is moveable about the joint between: (i) a flight configuration for use during flight, and (ii) a ground configuration for use during ground-based operations, wherein in the ground configuration, the wing tip device is moved relative to the fixed wing such that an span of the wing is reduced, wherein the aircraft comprises a first wiring harness and a second wiring harness, the first and second wiring harnesses extending between the fixed wing and the wing tip device, and each of the first and second wiring harnesses comprising a plurality of conductors arranged to transmit electrical power and/or data to the wing tip device, wherein the first and second wiring harnesses are received in a protective sleeve, the sleeve comprising a first channel in which the first wiring harness is received and a second channel in which the second wiring harness is received, a position of the first channel is fixed, relative to the second channel, such that the first and second wiring harnesses are held apart, and wherein the aircraft comprises a first sleeve guide and a second sleeve guide each including an outer arcuate surface in contact with the sleeve during movement of the wing tip device from the flight configuration to the ground configuration.

* * * * *